United States Patent
Manabe et al.

(10) Patent No.: US 9,890,062 B2
(45) Date of Patent: Feb. 13, 2018

(54) ELECTROLYTIC ENRICHMENT METHOD FOR HEAVY WATER

(71) Applicant: INDUSTRIE DE NORA S.p.a., Milan (IT)

(72) Inventors: Akiyoshi Manabe, Fujisawa (JP); Yoshinori Nishiki, Fujisawa (JP); Akira Kunimatsu, Fujisawa (JP)

(73) Assignee: INDUSTRIE DE NORA S.P.A., Milan (IT)

( * ) Notice: Subject to any disclaimer, the term of this patent is extended or adjusted under 35 U.S.C. 154(b) by 198 days.

(21) Appl. No.: 14/902,363

(22) PCT Filed: Jul. 24, 2014

(86) PCT No.: PCT/EP2014/065948
§ 371 (c)(1),
(2) Date: Dec. 31, 2015

(87) PCT Pub. No.: WO2015/014716
PCT Pub. Date: Feb. 5, 2015

(65) Prior Publication Data
US 2016/0368789 A1    Dec. 22, 2016

(30) Foreign Application Priority Data

Jul. 31, 2013 (JP) .................... 2013-158735

(51) Int. Cl.
*C02F 1/46* (2006.01)
*C02F 1/461* (2006.01)
(Continued)

(52) U.S. Cl.
CPC .............. *C02F 1/461* (2013.01); *B01D 59/40* (2013.01); *C01B 5/02* (2013.01); *C01B 13/0207* (2013.01);
(Continued)

(58) Field of Classification Search
None
See application file for complete search history.

(56) References Cited

U.S. PATENT DOCUMENTS

2008/0296167 A1* 12/2008 Davidson ............... C25L 39/08
205/334

FOREIGN PATENT DOCUMENTS

GB        726532 A    3/1955
JP        8-26703 A   1/1996
(Continued)

OTHER PUBLICATIONS

International Search Report based on International application No. PCT/EP2014/065948, dated Sep. 17, 2014. (3 pages).
(Continued)

*Primary Examiner* — Arun S Phasge
(74) *Attorney, Agent, or Firm* — Lucas & Mercanti, LLP

(57) ABSTRACT

An electrolytic enrichment method for heavy water includes enriching heavy water by electrolysis using an alkaline water electrolysis cell including an anode chamber that holds an anode, a cathode chamber that holds a cathode, and a diaphragm. In the method, an electrolyte prepared by adding high-concentration alkaline water to raw material water containing heavy water is circularly supplied to the anode chamber and the cathode chamber from a circulation tank; an anode-side gas-liquid separator and an anode-side water-seal device are connected to the anode chamber, and a cathode-side gas-liquid separator and a cathode-side water-seal device are connected to the cathode chamber; and electrolysis is continued while the alkali concentration in the electrolyte supplied to both electrolysis chambers is maintained at a constant concentration by circularly supplying, to the circulation tank, the electrolyte from which the gas
(Continued)

generated from the anode-side gas-liquid separator and the cathode-side gas-liquid separator is separated.

9 Claims, 1 Drawing Sheet

(51) Int. Cl.
    *B01D 59/40*     (2006.01)
    *C01B 5/02*     (2006.01)
    *C25B 1/04*     (2006.01)
    *C01B 13/02*     (2006.01)

(52) U.S. Cl.
    CPC ........ *C25B 1/04* (2013.01); *C02F 2001/4619* (2013.01); *C02F 2201/46185* (2013.01); *Y02E 60/366* (2013.01)

(56) References Cited

FOREIGN PATENT DOCUMENTS

| | | |
|---|---|---|
| JP | 8-323154 A | 12/1996 |
| WO | 9635638 A1 | 11/1996 |
| WO | 2009157435 A1 | 12/2009 |

OTHER PUBLICATIONS

Muranaka et al, "Electrolytic Enrichment of Tritium in Water Using SPE Film", Electrolysis, 2012, Ch.7, pp. 141-162.

\* cited by examiner

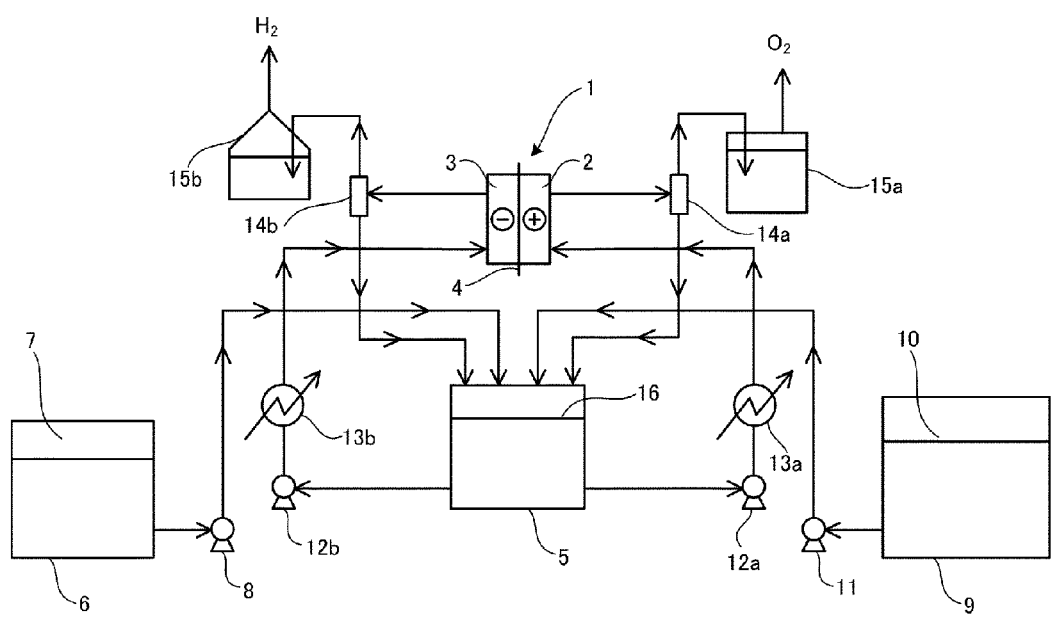

ELECTROLYTIC ENRICHMENT METHOD FOR HEAVY WATER

This application is a U.S. national stage of PCT/EP2014/065948 filed on Jul. 24, 2014 which claims the benefit of priority from Japanese Patent Application No. 2013-158735 filed Jul. 31, 2013 the contents of each of which are incorporated herein by reference.

BACKGROUND OF THE INVENTION

1. Field of the Invention

The present invention relates to an electrolytic enrichment method for heavy water, in which heavy water is enriched by electrolysis with an alkaline water electrolysis cell.

2. Description of the Related Art

Heavy water is water containing many isotopic water molecules with large mass numbers and having higher specific gravity than general water. Heavy water has physical and chemical properties slightly different from those of general water. General water is referred to as "light water" relative to heavy water. Heavy water contains hydrogen isotopes such as deuterium (D, 2H) and tritium (T, 3H), and oxygen isotopes 17O and 18O.

In the field of determination of safety of an atomic power plant, prediction of crustal movement, measurement of a hot-spring groundwater system, or the like, analysis of deuterium (D, 2H) and tritium (T, 3H) in natural water is becoming important. A tritium concentration is a very low level, and thus electrolytic enrichment is generally conducted for improving measurement accuracy. A generally known electrolytic enrichment method for heavy water includes preparing a sample solution in which an electrolyte is dissolved, and electrolyzing the solution using flat plates disposed to face each other. Water contained in an electrolyte contains HOD and HOT in addition to $H_2O$, and these are decomposed into hydrogen and oxygen according to usual water electrolysis, but $H_2O$ is decomposed in preference to decomposition of HOD and HOT by the isotope effect to increase the concentrations of deuterium and tritium in the electrolyte, resulting in enrichment. In this electrolysis, nickel is used as an anode, and steel, iron, or nickel is used as a cathode, and these electrodes are washed and used for electrolysis under current-carrying conditions in a glass container which contains sample water prepared by adding diluted sodium hydroxide as a support salt to an aqueous solution containing heavy water. Heavy water is generally enriched by continuing electrolysis with a current density of 1 to 10 $A/dm^2$ until a liquid amount becomes $\frac{1}{10}$ or less while the solution temperature is kept at 5° C. or less in order to prevent water evaporation due to the heat generated.

That is, electrolytic enrichment uses the property that tritium water is less electrolyzed than light hydrogen water. A method for electrolysis using metal electrodes inserted into an alkaline aqueous solution has already been frequently studied and publicly standardized in a manual as a standard method. This method includes one-stage enrichment of tritium concentrations. However, in practice, a general method for electrolytic enrichment has some problems. The problems lie in complicated experiment operations, a tritium enrichment rate limited to the upper limit of an electrolyte concentration, a danger of explosion due to the occurrence of mixed gas of hydrogen and oxygen, much time required for electrolysis, and unsuitableness for large-capacity treatment.

Since a technique is considered in view of one-step separation and capture of a dilute inclusion, the problems are due to trouble with handling an aqueous alkaline electrolyte solution, difficulty in separating gases generated on both electrodes, difficulty in increasing an electrolysis current due to the generation of bubbles on a metal surface, etc., which are mainly caused in a general electrolytic method of an aqueous alkaline solution.

On the other hand, a water electrolytic method recently attracting attention is a water electrolytic method (hereinafter referred to as "SPE water electrolysis") using a solid polymer electrolyte (hereinafter referred to as "SPE"). In the early 1970s, US General Electric Company first applied fuel cell technology to the SPE water electrolysis in such a manner that an electrolysis portion having a structure including a SPE membrane held between porous metal electrodes is immersed in pure water, and electrolysis is performed only by passing a current, generating decomposed gas from the porous electrodes. The SPE is one type of cation exchange resins and has a polymer chain to which sulfonic acid groups contributing to ionic conduction are chemically bonded. When a current is passed between both electrodes, water is decomposed, and oxygen gas is generated on an anode, generating hydrogen ions. The hydrogen ions move through the sulfonic acid groups in the SPE, reach the cathode, and receive electrons to generate hydrogen gas. The SPE is apparently maintained in a solid state without being changed. When the SPE is used for tritium electrolytic enrichment, the advantages below can be expected as compared with usual methods.

1) Distilled water can be directly decomposed. That is, dissolution, neutralization, and removal of an electrolyte, which are essential for an electrolytic method of an alkaline aqueous solution, are not required, and a volume reduction factor of sample water is basically unlimited.

2) An electrode surface is not covered with bubbles, and thus electrolysis can be performed with a large current, thereby shortening the electrolysis time.

3) Since hydrogen gas and oxygen gas are generated separately on both sides of the SPE membrane, the gases can be easily treated. This is far safer than a usual method including handling explosive mixed gas.

Also, the applicant has proposed an electrolytic enrichment method for heavy water by SPE water electrolysis in Japanese Unexamined Patent Application Publication Nos. 8-26703 (U.S. Pat. No. 3,406,390) and 8-323154 (U.S. Pat. No. 3,977,446) and Tritium Electrolytic Enrichment using Solid Polymer Electrolyte (RADIOISOTOPES, Vol. 45, No. 5, May 1996 (issued by Japan Radioisotope Association).

However, the method proposed in these documents can be applied to an analysis apparatus and small-scale enrichment treatment, but is unsuitable for large-scale treatment. No current flows through the electrolyte because the electrolyte used is pure water, and thus the solid polymer membrane used as a component must be strongly crimped with the anode and the cathode under surface pressure corresponding to 20 to 30 $Kg/cm^2$. Therefore, members of an electrolysis cell are required to have high strength, and in view of economy and operationality, it is unrealistic to secure a large reaction area of 1 $m^2$ or more, thereby undesirably increasing the equipment cost for electrolytic enrichment and fractionation of raw material water containing a large amount of heavy water.

SUMMARY OF THE INVENTION

Accordingly, it is an object of the present invention to resolve the problems of the related art and provide an electrolytic enrichment method for heavy water capable of electrolytic enrichment and fractionation of raw material water containing a large amount of heavy water by an alkaline water electrolytic method, and capable of producing high-purity hydrogen gas and/or high-purity oxygen gas.

In order to achieve the object, first resolving means of the present invention is to provide an electrolytic enrichment method for heavy water, the method including enriching heavy water by electrolysis with an alkaline water electrolysis cell which includes an anode chamber that holds an anode, a cathode chamber that holds a cathode, and a diaphragm that divides between the anode chamber and the cathode chamber. In the electrolytic enrichment method, an electrolyte prepared by adding high-concentration alkaline water to raw material water containing heavy water containing tritium is circularly supplied to both electrolysis chambers including the anode chamber and the cathode chamber from a circulation tank containing the electrolyte; an anode-side gas-liquid separator and an anode-side water-seal device are connected to the anode chamber, and a cathode-side gas-liquid separator and a cathode-side water-seal device are connected to the cathode chamber; and electrolysis is continued while the alkali concentration in the electrolyte supplied to both electrolysis chambers is maintained at a constant concentration by circularly supplying, to the circulation tank, the electrolyte from which the gas generated from each of the anode-side gas-liquid separator and the cathode-side gas-liquid separator is separated, thereby enriching heavy water in the electrolyte. At the same time, the hydrogen gas is recovered or discharged from the cathode-side gas-liquid separator, and the oxygen gas is recovered or discharged from the anode-side gas-liquid separator.

In order to achieve the object, second resolving means of the present invention is to provide an electrolytic enrichment method for heavy water wherein electrolysis is continued while the alkali concentration of the electrolyte is maintained at the initial concentration by supplying the raw material water in an amount corresponding to the water disappearing by electrolysis to the circulation tank.

In order to achieve the object, third resolving means of the present invention is to provide an electrolytic enrichment method for heavy water wherein the alkali concentration of the electrolyte is 1.5% to 40% by mass.

In order to achieve the object, fourth resolving means of the present invention is to provide an electrolytic enrichment method for heavy water wherein the alkali concentration of the electrolyte is 20% to 30% by mass.

In order to achieve the object, fifth resolving means of the present invention is to provide an electrolytic enrichment method for heavy water wherein electrolysis is continued while the alkali concentration of the electrolyte is maintained at a constant concentration by supplying the raw material water to the circulation tank so that the alkali concentration of the electrolyte does not exceed 40% by mass.

In order to achieve the object, sixth resolving means of the present invention is to provide an electrolytic enrichment method for heavy water wherein electrolysis is continued while the alkali concentration of the electrolyte is maintained at a constant concentration by supplying the raw material water to the circulation tank so that the alkali concentration of the electrolyte does not exceed 30% by mass.

In order to achieve the object, seventh resolving means of the present invention is to provide an electrolytic enrichment method for heavy water wherein the pressure in the cathode chamber and the pressure in the anode chamber are adjusted by adjusting the height of a water surface in the cathode-side water-seal device and the height of a water surface in the anode-side water-seal device, respectively, in order to control a ratio of the oxygen gas generated in the anode chamber and mixed in the hydrogen gas generated in the cathode chamber and/or a ratio of the hydrogen gas generated in the cathode chamber and mixed in the oxygen gas generated in the anode chamber.

In order to achieve the object, eighth resolving means of the present invention is to provide an electrolytic enrichment method for heavy water wherein the diaphragm is a neutral diaphragm.

In order to achieve the object, ninth resolving means of the present invention is to provide an electrolytic enrichment method for heavy water wherein the diaphragm is a cation-exchange membrane.

According to the present invention, a radioactive waste containing a large amount of tritium can be effectively enriched and fractionated by alkaline water electrolysis, and high-concentration and high-purity hydrogen gas and/or oxygen gas can be effectively recovered.

Further, according to the present invention, the anode chamber and the cathode chamber are provided on both sides of the diaphragm, and the common alkaline electrolyte is circularly supplied to the anode chamber and the cathode chamber from one circulation tank, so that in the operation system, the alkali concentrations in the anode chamber and the cathode chamber can be always controlled to the same concentration by returning and maintaining, to and in the same circulation tank, the electrolyte discharged from each of the anode chamber and the cathode chamber by electrolyte electrolysis which decreases the alkali concentration in the anode chamber and increases the alkali concentration in the cathode chamber. Also, the alkali concentration in the system can be always kept at a predetermined initial condition by supplying the raw material water in an amount corresponding to the water disappearing by electrolysis. In any case, a method for operating an alkaline water electrolysis circulation process is an effective operation method because multi-purpose operation management of batch operation and continuous operation of a plant can be realized according to purposes of plant operation only by adjusting a predetermined alkali concentration in the early stage of operation. Also, operation management is not complicated, and thus safe operation can be performed in a plant level. On the other hand, when the alkali concentration cannot be controlled under predetermined conditions, a cell voltage changes with changes in the alkali concentration, thereby changing the quantity of heat generated with Joule heat. When the cell temperature is increased, the amount of water evaporated is increased, and thus cooling conditions are also changed. Therefore, variation in the alkali concentration is undesired because of variation in operation conditions with variation in the alkali concentration. However, this problem can be resolved by alkaline water electrolysis according to the present invention.

Further, according to the present invention, heavy water can be effectively enriched by alkaline water electrolysis with the electrolyte at the alkali concentration of 1.5% to 4% by mass. Continuous water electrolysis permits theoretical desired volume reduction, thereby permitting enrichment to a desired value.

Further, according to the present invention, in the electrolysis process, when each of the anode gas and the cathode gas is separated by the gas-liquid separator, then water-sealed, and discharged, a ratio of the oxygen gas generated in the anode chamber and transferred to the cathode chamber can be controlled by controlling the gas pressure on the cathode side to be higher or lower than the gas pressure on the anode side. Therefore, according to the present invention, the electrolysis process can be controlled within explosion limits by controlling a mixing ratio between the oxygen gas and the hydrogen gas, thereby decreasing a danger of explosion and producing high-purity hydrogen gas and/or high-purity oxygen gas.

BRIEF DESCRIPTION OF THE DRAWING

FIGURE is a flow diagram illustrating an electrolytic enrichment method for heavy water according to an embodiment of the present invention.

DESCRIPTION OF THE PREFERRED EMBODIMENTS

An embodiment of the present invention is described below with reference to the drawing.

FIGURE is a flow diagram illustrating an electrolytic enrichment method for heavy water according to an embodiment of the present invention. In FIGURE, reference numeral 1 denotes an alkaline water electrolysis cell, and the alkaline water electrolysis cell 1 includes an anode chamber 2 that holds an anode, a cathode chamber 3 that holds a cathode, and a diaphragm 4 that divides between the anode chamber 2 and the cathode chamber 3. Reference numeral 5 denotes a circulation tank; reference numeral 6, an alkaline water tank that stores high concentration of alkaline water 7 generally required only for adjusting the initial alkaline electrolyte; reference numeral 8, a feed pump that supplies the alkaline water 7 in the alkaline water tank 6 to the circulation tank 5; reference numeral 9, a raw material tank that stores raw material water 10; and reference numeral 11, a feed pump that supplies the raw material water 10 in the raw material tank 9 to the circulation tank 5. The alkaline water 7 and the raw material water 10 are mixed in the circulation tank 5 to produce an electrolyte 16 adjusted to alkaline water at a predetermined concentration.

The electrolyte controlled to a predetermined concentration by mixing in the circulation tank 5 is supplied to the anode chamber 2 of the alkaline water electrolysis cell 1 through a circulation pump 12a and a heat exchanger 13a and is supplied to the cathode chamber 3 of the alkaline water electrolysis cell 1 through a circulation pump 12b and a heat exchanger 13b.

The electrolyte controlled to a predetermined concentration of alkaline water is electrolyzed in the anode chamber 2 and enriched by electrolysis to produce an enriched electrolyte, and oxygen gas is generated in the anode chamber 2. The generated oxygen gas and electrolyte are separated into gas and liquid by a gas-liquid separator 14a, and the separated electrolyte is circulated to the circulation tank 5. The oxygen gas separated by the anode-side gas-liquid separator 14a is exhausted through an anode-side water-seal device 15a.

At the same time, hydrogen gas is generated in the cathode chamber 3. The generated hydrogen gas and electrolyte are separated into gas and liquid by a cathode-side gas-liquid separator 14b, and the separated electrolyte is circulated to the circulation tank 5. The hydrogen gas separated by the anode-side gas-liquid separator 14b is exhausted through a cathode-side water seal device 15b. In addition, water is supplied as raw material water to be supplied from the raw material tank 9 by supplying the raw material water in an amount corresponding to the water disappearing by electrolysis in order to continue electrolysis while maintaining the electrolysis conditions constant and to control the alkali concentrations in both electrolysis chambers.

The electrolyte at the alkali concentration initially adjusted can be maintained by continuously supplying the raw material water in an amount corresponding to the water disappearing by electrolysis. On the other hand, an intermittent operation of volume reduction of the electrolyte (raw material water to be treated) can also be carried out by continuing intermittent alkaline water electrolysis circulation without continuous supply of the raw material water.

(Condition for Alkaline Water Electrolysis)

In alkaline water electrolysis according to the present invention, an electrolyte prepared by adding high-concentration alkaline water to the raw material water composed of heavy water containing tritium so that a predetermined alkali concentration is obtained is used as the electrolyte. The electrolyte is preferably a caustic alkali such as caustic potassium, caustic sodium, or the like, and the concentration thereof is preferably 1.5% to 40% by mass. In particular, in view of suppressing the power consumption, a concentration of 15% to 40% by mass within a region with high electric conductivity is preferred. However, in view of electrolysis cost, corrosion resistance, viscosity, and operationality, the concentration is more preferably 20% to 30% by mass.

The concentration of the high-concentration alkaline water added to the raw material water is preferably 10% to 30% by mass.

A method for operation at a constant alkali concentration includes, for example, continuously supplying the raw material water in an amount corresponding to the amount of water consumed after controlling the initial alkali concentration. When an intermittent operation is desired for reducing the volume of the raw material water to be treated, a method of checking a reduction in amount of the electrolyte initially adjusted may be used. In this case, the initially adjusted alkali concentration is increased in proportion to the amount of water reduced.

As the region of the alkali concentration, a region in which liquid resistance is increased is undesired. For example, when the alkali concentration exceeds 40% by mass, generated gases tend to become difficult to remove from the electrolyte (due to increase in liquid viscosity), and thus the cell voltage is increased, resulting in an increase in cell temperature due to the generation of Joule heat and the need for an excessive operation management such as the need for cooling the electrolyte or the like.

Therefore, since the alkali concentration is increased by enrichment of the raw material water, it is preferred that the alkali concentration is kept constant by adding the raw material water so that the alkali concentration does not exceed 40% by mass or 30% by mass.

In the present invention, in view of economy, heavy water is enriched about 10 times by electrolytic volume reduction, and when the initial concentration of heavy water in the raw material water is 2.5% by mass, the final concentration is 25% by mass because water is released by electrolysis.

(Water-Seal System)

Further, in the present invention, the electrolyte from which the generated gas is separated by each of the gas-liquid separators 14a and 14b is circularly supplied to each of the electrolysis chambers including the anode chamber 2 and the cathode chamber 3, thereby controlling the alkali concentrations in both electrolysis chambers. At the same time, the raw material water in an amount corresponding to the amount of water disappearing by electrolysis is supplied to both electrolysis chambers including the anode chamber 2 and the cathode chamber 3 from the raw material tank 9 through the circulation tank 5. Therefore, heavy water in the raw material water is enriched by continuing electrolysis while maintaining the electrolysis conditions constant.

In order to control the concentration constant, the raw material water 10 in an amount corresponding to the water consumed is continuously supplied to the circulation tank 5.

On the other hand, even when the alkali concentration is allowed to gradually increase to a high concentration up to a concentration limit of the alkaline water electrolysis of 40% by mass, volume reduction of the electrolyte can be confirmed. Also, under these conditions, the final concentration of 40% by mass can be then maintained by starting the supply of the raw material water.

Therefore, the circulation system proposed in the present invention can be operated by any of the methods and thus has flexibility.

Further, in the present invention, the pressure in the cathode chamber 3 and the pressure in the anode chamber 2 are controlled by controlling the height of the water surface in the cathode-side water-seal device 15b and the anode-side water-seal device 15a, respectively, in order to control a ratio of the oxygen gas generated in the anode chamber 2 and mixed with the hydrogen gas generated in the cathode chamber 3.

The anode gas (oxygen gas) and the cathode gas (hydrogen gas) are separated by the anode-side gas-liquid separator 14a and the cathode-side gas-liquid separator 14b, water-sealed in the anode-side water-seal device 15a and the cathode-side water-seal device 15b, respectively, and then exhausted. In this case, the height of the water surface in the cathode-side water-seal device 15b is controlled to be higher than that in the anode-side water-seal device 15a so that the gas pressure on the cathode side is higher than the gas pressure on the anode side. This can decrease the transfer of the oxygen gas generated in the anode chamber 2 to the cathode chamber 3, thereby improving the purity of hydrogen gas. Conversely, when the purity of oxygen gas is desired to be improved, the height of the water surface in the anode-side water-seal device 15a is controlled to be higher than that in the cathode-side water-seal device 15b so that the gas pressure on the anode side is higher than the gas pressure on the cathode side. This can decrease the transfer of the hydrogen gas generated in the cathode chamber 3 to the anode chamber 2, thereby improving the purity of oxygen gas.

(Alkaline Water Electrolysis Cell)

A two-chamber electrolysis cell including an anode and a cathode provided on both sides of the diaphragm 4 is used as the alkaline water electrolysis cell 1. Also, a zero-gap electrolysis cell including an anode and a cathode which adhere to the diaphragm 4, a finite electrolysis cell including an anode and a cathode which are provided slightly apart from the diaphragm 4, or a spaced-type electrolysis cell including an anode and a cathode which are provided apart from the diaphragm 4 can be used. In order to prevent variation in position and oscillation of the membrane and to prevent damage to the membrane diaphragm 4 during the operation, an operating differential pressure is preferably provided between the anode chamber and the cathode camber, depending on the operation electric current density. For example, a differential pressure of 50 to 500 mmH$_2$O can be provided, and this differential pressure permits further control of the ratio of the oxygen gas generated in the anode chamber 2 and mixed in the hydrogen gas generated in the cathode chamber 3.

In addition, when a neutral diaphragm is used as the diaphragm, the pore size of the diaphragm used is decreased or the diaphragm with a specially-treated surface is used so that transfer of the oxygen gas generated in the anode chamber to the cathode chamber or transfer of the hydrogen gas generated in the cathode chamber to the anode chamber can be decreased.

(Diaphragm)

A neutral diaphragm, a fluorine-type or hydrocarbon-type cation exchange membrane for brine electrolysis, and a cation exchange membrane for fuel cells can be used as the diaphragm 4. When a cation exchange membrane is used, a hydrogen concentration in oxygen is about 0.13% at an oxygen concentration in hydrogen of 0.07%.

On the other hand, when a neutral diaphragm specially treated is used as the diaphragm 4, a hydrogen concentration in oxygen is 0.05% to 0.08% at an oxygen concentration in hydrogen of 0.06% to 0.09%.

(Anode and Cathode)

The anode and the cathode are selected to be made of a material which can resist alkaline water electrolysis and to have low anode overvoltage and cathode overvoltage, respectively. In general, the anode composed of iron or Ni-plated iron is used, and the cathode composed of a Ni base material or a Ni base material coated with an active cathode material is used. A nickel expanded mesh, a porous nickel expanded mesh, a metal electrode including an iron base having a surface coated with a noble metal or an oxide thereof, or the like can be used as each of the anode and the cathode.

EXAMPLES

Next, examples of the present invention are described, but the present invention is not limited to these examples.

Example 1

A test was conducted with an electrolysis cell having an electrolysis area of 1.0 dm$^2$. Both an anode chamber (volume 400 ml) and a cathode chamber (volume 400 ml) were composed of Ni, and the anode included an expanded mesh (thickness 0.8 mm×short width (SW) 3.7 mm×long width (LW) 8.0 mm) with an active anode coating. The cathode included a fine mesh (thickness 0.15 mm×SW 2.0 mm×LW 1.0 mm) with a noble metal-based active cathode coating.

A polypropylene-based film of 100 μm was used as a diaphragm, held between both electrodes, and assembled with a zero gap.

A test process is as illustrated in FIGURE, in which an electrolysis temperature is controlled with a heater provided at the bottom of an electrolysis cell. An electrolyte is circulated by a method in which the electrolyte is supplied with circulation pumps 12a and 12b at a flow rate of 40 to 60 ml/min to the anode chamber 2 and the cathode chamber 3 through electrolyte supply nozzles from the circulation tank 5 (electrolyte volume: 2.5 L) provided below the alkaline water electrolysis cell 1. The liquids in gas-liquid fluids discharged from upper nozzles of the electrolysis cell 1 are returned to the circulation tank 5 through the gas-liquid separators 14a and 14b, and gases are discharged to the outside. The operation conditions include 40 A/dm$^2$, 10% by mass KOH, an electrolysis temperature of 75° C. to 85° C., and pressure in the cell system which is determined by water-sealing the oxygen gas and hydrogen gas discharged from the anode chamber and the cathode chamber, respectively. In order to prevent vibration of the diaphragm during the operation, a differential pressure between the anode chamber and the cathode chamber is kept at 50 to 100 mmH$_2$O.

On the other hand, the liquid height in each of the water-seal systems can be controlled depending on which of the produced hydrogen gas and oxygen gas is expected to have desired purity. In this example, in order to increase hydrogen purity, a differential pressure was 50 mmH$_2$O with pressure applied to the cathode.

In an actual process, a large amount of raw material water is simply treated by continuously supplying the raw material water in an amount corresponding to the amount of water hydrolyzed. However, in this example, effectiveness was examined by measuring the enrichment rate of sample water containing tritium, cell voltage, and hydrogen purity without adding the raw material water in an amount corresponding to the amount of water hydrolyzed to the initial prepared electrolyte in the circulation system.

When the operation was continued until an integrated current value was 4800 Ah (continuous operation for 5 days), the total amount of the electrolyte was decreased to 1.7 L from the initial prepared volume of 3.3 L. In view of slight evaporation and the amount of unrecovered water in electrolysis pipes in spite of recovery from the system, the amount of water reduced is a value substantially equivalent to a theoretical value.

As a result, the electrolyte in a volume of 4.125 times the volume of the electrolysis cell was enriched 1.96 times. This represents that raw material water in a volume of 4 times or more the volume of the electrolysis cell can be treated with no trouble, and continuous enrichment can be performed by continuously supplying raw material water. That is, from the viewpoint of volume reduction of raw material water, the volume of raw material water can be reduced in proportion to the integrated current value applied to the system.

The 10 mass % KOH electrolyte initially prepared was finally 19.6 mass % KOH after current supply of 4800 Ah. This represents that the concentration was increased by a value corresponding to the water disappearing. That is, this indicates that the initially prepared alkali (here, caustic alkali KOH) is stayed in the system without being consumed. The same applies to the case where caustic soda NaOH is used as the alkali, and the alkali is not limited to caustic potassium KOH.

On the other hand, the initial adjusted alkali concentration can be kept at the initial value by continuously supplying the raw material water in an amount corresponding to the amount of water hydrolyzed.

When the integrated current was 4800 Ah, the voltage, hydrogen purity, and tritium recovery rate were as follows.

Test results: 1.7 V, hydrogen purity 99.9%, tritium recovery rate 0.6

All of the gas purity, tritium recovery rate, and operation voltage were good.

Example 2

A test was conducted by the same method as in Example 1 except that a PTFE film having a thickness of 70 to 90 µm and an average pore size of 1 µm or less was used as a diaphragm. The test results were as follows.

Test results: 1.95 V, hydrogen purity 98.9%, tritium recovery rate 0.6

All of the gas purity, tritium recovery rate, and operation voltage were good.

Example 3

A test was conducted by the same method as in Example 1 except that an ion exchange membrane for brine electrolysis was used as a diaphragm. The test results were as follows.

Cation exchange membrane used: Flemion (trade name of Asahi Glass Co., Ltd.) F8020SP Test results: 2.1 to 2.4 V, hydrogen purity 99.93%, tritium recovery rate 0.6

The highest gas purity and good tritium recovery rate were obtained, but the operation voltage was high, resulting in the tendency to increase power consumption.

Example 4

A test was conducted by the same method as in Example 1 except that an ion exchange membrane for fuel cells described below was used as a diaphragm. The test results were as follows.

Cation exchange membrane used: Nafion (trade name of DuPont Company) N117

Test results: 2.3 to 2.6 V, hydrogen purity 99.92%, tritium recovery rate 0.6

The good gas purity and good tritium recovery rate were obtained, but the operation voltage was very high, resulting in the tendency to increase power consumption.

According to the present invention, radioactive waste containing a large amount of tritium can be efficiently enriched and fractionated by electrolysis with high-concentration alkaline water, and high-concentration, high-purity hydrogen gas can be efficiently recovered. Also, the alkali concentration in the system can be always kept constant by providing an anode chamber and a cathode chamber on both sides of a diaphragm and circularly supplying a common alkaline electrolyte to both the anode chamber and the cathode chamber from a circulation tank. Therefore, a plant-level operation can be safely performed, thereby expecting wide-ranging utilization.

The invention claimed is:

1. An electrolytic enrichment method for heavy water, the method comprising:
    enriching heavy water by electrolysis using an alkaline water electrolysis cell consisting of an anode chamber that holds an anode, a cathode chamber that holds a cathode, and a diaphragm that divides between the anode chamber and the cathode chamber,
    wherein an electrolyte prepared by adding high-concentration alkaline water to raw material water consisting of heavy water containing tritium is circularly supplied to both electrolysis chambers including the anode chamber and the cathode chamber from a circulation tank containing the electrolyte;
    an anode-side gas-liquid separator and an anode-side water-seal device are connected to the anode chamber, and a cathode-side gas-liquid separator and a cathode-side water-seal device are connected to the cathode chamber; and
    continuing electrolysis while the alkali concentration in the electrolyte supplied to the both electrolysis chambers is maintained at a constant concentration by circularly supplying, to the circulation tank, the electrolyte from which the gas generated from each of the anode-side gas-liquid separator and the cathode-side gas-liquid separator is separated, so that heavy water in the electrolyte is enriched and, at the same time, the hydrogen gas is recovered or discharged from the cathode-side gas-liquid separator and the oxygen gas is recovered or discharged from the anode-side gas-liquid separator.

2. The electrolytic enrichment method for heavy water according to claim 1, wherein electrolysis is continued while the alkali concentration of the electrolyte is maintained at the initial concentration by supplying raw material water in the amount corresponding to the water disappearing by the electrolysis to the circulation tank.

3. The electrolytic enrichment method for heavy water according to claim 1, wherein the alkali concentration of the electrolyte is 1.5% to 40% by mass.

4. The electrolytic enrichment method for heavy water according to claim 1, wherein the alkali concentration of the electrolyte is 20% to 30% by mass.

5. The electrolytic enrichment method for heavy water according to claim 1, wherein electrolysis is continued while the alkali concentration of the electrolyte is maintained at a constant concentration by supplying the raw material water to the circulation tank so that the alkali concentration of the electrolyte does not exceed 40% by mass.

6. The electrolytic enrichment method for heavy water according to claim 5, wherein electrolysis is continued while the alkali concentration of the electrolyte is maintained at a constant concentration by supplying the raw material water to the circulation tank so that the alkali concentration of the electrolyte does not exceed 30% by mass.

7. The electrolytic enrichment method for heavy water according to claim 1, wherein the pressure in the cathode chamber and the pressure in the anode chamber are adjusted by adjusting the height of a water surface in the cathode-side water-seal device and the height of a water surface in the anode-side water-seal device, respectively, in order to control the ratio of the oxygen gas generated in the anode chamber mixed into the hydrogen gas generated in the cathode chamber and/or the ratio of the hydrogen gas generated in the cathode chamber mixed into the oxygen gas generated in the anode chamber.

8. The electrolytic enrichment method for heavy water according to claim 1, wherein the diaphragm is a neutral diaphragm.

9. The electrolytic enrichment method for heavy water according to claim 1, wherein the diaphragm is a cation-exchange membrane.

* * * * *